United States Patent
Hawley

(10) Patent No.: US 11,731,628 B2
(45) Date of Patent: Aug. 22, 2023

(54) SYSTEMS AND METHODS FOR HIGH MOTOR SPEED REGENERATIVE BREAKING

(71) Applicant: Toyota Motor Engineering & Manufacturing North America, Inc., Plano, TX (US)

(72) Inventor: Thomas S. Hawley, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 117 days.

(21) Appl. No.: 17/199,717

(22) Filed: Mar. 12, 2021

(65) Prior Publication Data

US 2022/0289200 A1 Sep. 15, 2022

(51) Int. Cl.
*B60W 20/40* (2016.01)
*B60W 30/18* (2012.01)
*B60W 10/02* (2006.01)
*B60W 10/11* (2012.01)

(52) U.S. Cl.
CPC ...... *B60W 30/18127* (2013.01); *B60W 10/02* (2013.01); *B60W 10/11* (2013.01); *B60W 20/40* (2013.01); *B60W 2510/0638* (2013.01); *B60W 2510/081* (2013.01); *B60W 2520/10* (2013.01); *B60W 2540/10* (2013.01); *B60W 2540/12* (2013.01); *B60W 2554/406* (2020.02); *B60W 2554/4042* (2020.02); *B60W 2710/081* (2013.01); *B60W 2710/1005* (2013.01)

(58) Field of Classification Search
CPC ........... B60W 30/18127; B60W 10/02; B60W 10/11; B60W 20/30; B60W 20/40; B60W 2510/0638; B60W 251/081; B60W 2520/10; B60W 2540/10; B60W 2540/12; B60W 2710/081; B60W 2710/1005; B60W 10/08; B60W 2554/4042; B60W 2554/406
See application file for complete search history.

(56) References Cited

U.S. PATENT DOCUMENTS

| 5,655,990 A | 8/1997 | Ooyama et al. |
| 6,497,635 B2 * | 12/2002 | Suzuki ............ B60W 30/18054 477/3 |
| 9,002,604 B2 | 4/2015 | Toyota |
| 9,162,673 B2 | 10/2015 | Kawamoto et al. |

(Continued)

OTHER PUBLICATIONS

Clutch-to-clutch gearshift control for multi-speed electric vehicles during regenerative braking events (https://eeexplore.ieee.org/document/8754946) 2019.

*Primary Examiner* — Roger L Pang
(74) *Attorney, Agent, or Firm* — Dinsmore & Shohl LLP

(57) ABSTRACT

A method of controlling a hybrid-electric vehicle includes determining that a slow-down condition of the hybrid-electric vehicle comprises a reduction in speed of the hybrid-electric vehicle that is greater than or equal to a threshold. The method also includes modifying transmission shifting points in a regenerative braking mode to rotate an electric machine of the hybrid-electric vehicle above an engine start limit. The method also includes, in response to receiving an indication of an end of the slow-down condition, causing rotation of the electric machine above the engine start limit to trigger starting an engine of the hybrid-electric vehicle.

18 Claims, 9 Drawing Sheets

(56) References Cited

U.S. PATENT DOCUMENTS

| | | | |
|---|---|---|---|
| 9,481,371 B2 | 11/2016 | Park | |
| 9,616,895 B2* | 4/2017 | Nefcy | B60L 7/10 |
| 10,773,722 B2 | 9/2020 | Lee | |
| 2008/0119975 A1 | 5/2008 | Yamazaki et al. | |
| 2011/0118920 A1 | 5/2011 | Kim | |
| 2014/0066250 A1 | 3/2014 | Schulte et al. | |
| 2016/0152144 A1* | 6/2016 | Choi | B60W 20/00 903/945 |
| 2017/0197609 A1* | 7/2017 | Colvin | B60W 10/11 |
| 2018/0135744 A1* | 5/2018 | Kuang | B60W 10/08 |
| 2020/0290595 A1* | 9/2020 | Riegger | B60W 50/10 |

* cited by examiner

SYSTEMS AND METHODS FOR HIGH MOTOR SPEED REGENERATIVE BREAKING

BACKGROUND

Field

The present specification generally relates to systems and methods for regenerative breaking in hybrid electric vehicles with high electric machine speeds.

Technical Background

Hybrid-electric vehicles typically include two or more types of prime movers. For example, certain hybrid vehicle powertrains include an internal combustion engine and an electric machine. Depending on the operating condition of the hybrid-electric vehicle, the powertrains may be operated in a variety of different ways. When the driver releases an accelerator pedal to coast, for example, the engine may be disengaged from a driveshaft of the powertrain so as to increase fuel efficiency during periods when the engine is not needed to provide torque. Existing hybrid-electric vehicles may include various controller safeguards to avoid component damage in changing operational modes. Such controller safeguards may limit the regenerative braking efficiency of the hybrid-electric vehicle.

SUMMARY

According to one embodiment of the present disclosure, a method of controlling a hybrid-electric vehicle includes determining that a slow-down condition of the hybrid-electric vehicle comprises a reduction in speed of the hybrid-electric vehicle that is greater than or equal to a threshold. The method also includes modifying transmission shifting points in a regenerative braking mode to rotate an electric machine of the hybrid-electric vehicle above an engine start limit. The method also includes, in response to receiving an indication of an end of the slow-down condition, causing rotation of the electric machine above the engine start limit to trigger starting an engine of the hybrid-electric vehicle.

In another embodiment, a method of controlling a hybrid-electric vehicle includes disengaging an engine clutch connecting an output of an engine to a transmission of the hybrid-electric vehicle. The method also includes, while the engine clutch is disengaged, determining that a rotational speed of an electric machine is greater than or equal to an engine start limit. The method also includes engaging the engine clutch to start the engine and provide torque from the engine to the transmission. The method also includes, in response to determining that a slow-down condition of the hybrid electrode vehicle comprises a reduction in speed of the hybrid-electric vehicle that is greater than or equal to a threshold, modifying transmission shifting points in a regenerative braking mode to rotate the electric machine above the engine start limit. The method also includes, in response to receiving an indication of an end of the slow-down condition, causing rotation of the electric machine above the engine start limit to trigger starting the engine.

In another embodiment, a vehicle control system for a hybrid-electric vehicle includes a processing device and instructions that are executable by the processing device. The instructions cause the vehicle control system to determine that the hybrid vehicle is encountering a slow-down condition. The instructions also cause the vehicle control system to remove the hybrid vehicle from a first driving mode, in which the controller is configured to control a clutch to engage a mechanical output of an engine with an input shaft of an electric machine when a difference in rotational speed between the mechanical output of the engine and the electric machine is greater than or equal to a predetermined engine start limit. The instructions also cause the vehicle control system to place the hybrid vehicle into a regenerative braking mode, in which a transmission is controlled such that the rotational speed of the electric machine is above the predetermined engine start limit without the output of the engine being engaged with the input shaft.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
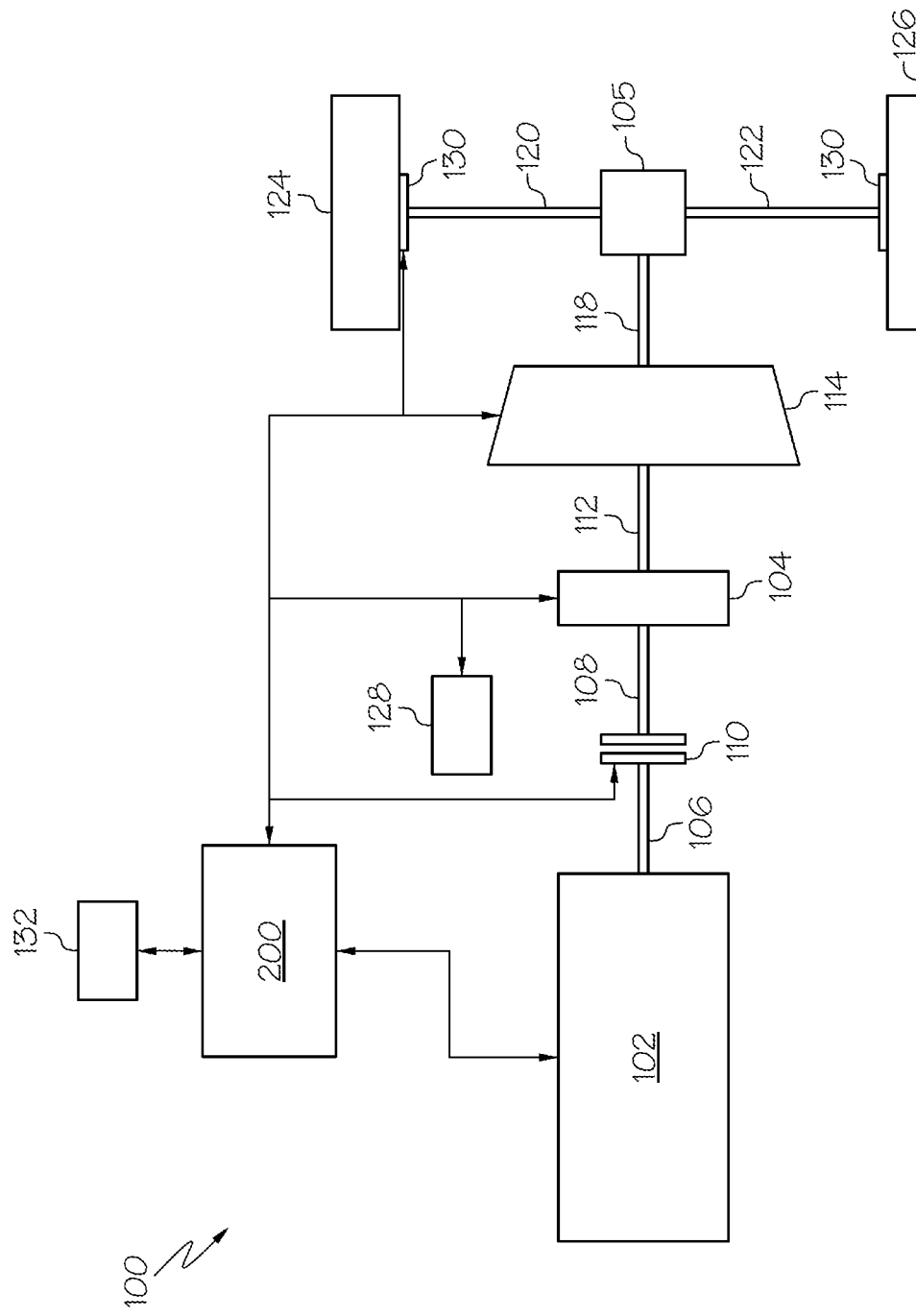
FIG. 1 schematically depicts a block diagram of an illustrative powertrain of a hybrid-electric vehicle including a vehicle control unit, according to one or more embodiments described herein.

The present disclosure relates generally to methods of controlling a powertrain of a hybrid-electric vehicle to maintain a rotational speed of an electric machine above a predetermined engine start limit during regenerative braking to improve regenerative power conversion efficiencies. In embodiments, the powertrain of the hybrid-electric vehicle controlled via the methods described herein includes an engine and an electric machine. The engine and the electric machine may be operatively coupled to one another via a clutch. The clutch may be selectively opened or closed to disengage and engage an output of the engine with an input shaft of the electric machine. A vehicle control system may monitor the operating conditions of the hybrid-electric vehicle and control various components thereof to switch the hybrid-electric vehicle between various driving modes. In embodiments, the vehicle control system may operate the powertrain in an electric vehicle ("EV") mode in which the engine is disengaged and the electric machine is utilized as a sole power source to drive traction wheels of the vehicle. In embodiments, the vehicle control system monitors a difference in rotational speed between an output of the electric machine and the output of the engine, and when the difference meets or exceeds a threshold, the control system may engage the clutch to start the engine to increase the rotational output thereof to maintain the difference below the threshold and prevent component damage. For example, the vehicle control system may close the clutch to start the engine when the hybrid-electric vehicle is descending a slope to prevent rotational speeds of the engine and electric machine outputs from deviating by more than the threshold, irrespective of acceleration commands received via driver inputs (e.g., an accelerator petal). When the hybrid-electric vehicle encounters a slow-down condition meeting the criteria described herein, such engine starting may be prevented to improve regenerative braking efficiency. When the vehicle encounters such a slow-down condition, the vehicle control system may operate the powertrain in a regenerative braking mode in which the output of the engine is disengaged via the clutch and the electric machine is rotated above the engine start limit to enhance power conversion efficiency during regenerative braking.

The transmission of the hybrid-electric vehicle may be operated in accordance with different shifting points in order to provide efficient regenerative braking while avoiding component damage. The regenerative braking mode described herein may be initiated in response to the vehicle control system determining that the hybrid-electric vehicle is encountering a slow-down condition in which the hybrid-electric vehicle may come to a stop or substantially slow down (e.g., by greater than or equal to 25 miles per hour). In embodiments, the determination that the hybrid-electric vehicle is encountering a slow-down condition is based on one or more of a brake pedal pressure sensor, an accelerator pedal pressure sensor, one or more sensors detecting the driving conditions of the vehicle (e.g., a camera or ranging system detecting other vehicles and/or environmental factors), and information from external sources (e.g., from a vehicle-to-vehicle communication system or a ground positioning system). In embodiments, the regenerative braking mode described herein is activated with a tiered activation system using multiple inputs. For example, the control logic described herein may initiate in response to receiving an indication of a slow-down condition based on driver inputs (e.g., in response to the driver releasing the accelerator pedal and/or pressing the brake pedal). After the indication, the regenerative braking mode may only be initiated on the condition that a confirmation of the slow-down condition is received from another source within a predetermined period of the initial indication of the slow-down condition being received. In embodiments, the confirmation may be from a sensor (e.g., a camera may detect stopped traffic) or other information (e.g., navigation data, vehicle-to-vehicle signal, or the like). Upon receipt of the confirmation, the vehicle control system may monitor the brake pedal pressure, and, once the brake pedal pressure exceeds a threshold, initiate the regenerative braking mode described herein where the transmission is operated in accordance with the shifting points described herein. Such a tiered approach beneficially avoids premature initiation of regenerative braking in the event that the driver decides to re-accelerate quickly after initially applying pressure to the brake pedal.

FIG. 1 schematically depicts a powertrain 100 for a hybrid vehicle in accordance with an example embodiment of the present disclosure. The powertrain 100 includes an engine 102, an electric machine 104, and a transmission 114. In embodiments, the engine 102 comprises an internal combustion engine, though alternative prime movers (e.g., fuel cell engines, turbine engines, or other suitable prime movers) are contemplated and within the scope of the present disclosure. The engine 102 includes an output shaft 106 (e.g., a crankshaft) that may be connected and disconnected from an input shaft 108 of the electric machine via an engine clutch 110. In embodiments, the engine clutch 110 is a hydraulic clutch or other suitable type of clutch (e.g., an electro-mechanical clutch). The electric machine 104 includes an output shaft, which is depicted as an input shaft 112 connected to the transmission 114. The transmission 114 comprises multiple gear ratios and transfers torque between the engine 102, electric machine 104, and a driveshaft 118. For example, in embodiments, the transmission 114 comprises a plurality of gear sets that are electively placed in different gear ratios by selective engagement of a plurality of friction elements (not depicted) in order to establish a desired drive ratio. The transmission 114 may be shifted between various gear ratios to rotate a driveshaft 118 at a rate determined based on the needs of the vehicle. Rotational energy of the driveshaft 118 is transferred to first and second axles 120 and 122 via a differential 105 and then to friction wheels 124 and 126. The transmission 114 may include any suitable multi-ratio transmission converting an input torque (e.g., from the input shaft 112) to an output torque (e.g., at the driveshaft 118). In embodiments, the powertrain 100 comprises a mechanical braking system comprising friction brakes 130 coupled to the first and second axles 120 and 122. In embodiments, the powertrain 100 includes a braking control system (not depicted) to control the amount of braking force applied to the wheels 124 and 126 via the friction brakes 130 in response to received inputs (e.g., the driver pressing a braking pedal).

The driveshaft 118 drives the friction wheels 124 and 126 based on the torque generated by the engine 102 and/or the electric machine 104. The source of the torque provided to the driveshaft 118 may depend on an operating mode of the powertrain 100. For example, in a hybrid driving mode, the engine clutch 110 may be closed such that the output shaft 106 is mechanically engaged with the input shaft 108. In the hybrid driving mode, the engine 102 generates a first torque (e.g., via combustion of a propellant) and the electric machine 104 draws electrical power from an energy storage device 128 (e.g., a battery) to generate a second torque. As indicated by the dashed lines in FIG. 1, the electric machine 104 may provide or draw power to and from the energy storage device 128 depending on the operational mode of the powertrain 100. In embodiments, the energy storage device 128 may also receive electric power from the engine 102 (e.g., via an alternator or separate generator, not depicted).

In embodiments, At least a portion of the torques generated by each of the engine 102 and electric machine 104 are provided to the transmission 114 via the input shaft 112 to propel the vehicle. In an electric driving mode, the engine clutch 110 may be in an open state such that the output shaft 106 is disengaged from the input shaft 108, and the electric machine 104 may draw power form the energy storage device 128 to solely propel the vehicle. In a regenerative braking mode, the electric machine 104 may generate electrical power from the driveshaft 118 and provide such generated power to charge the energy storage device 128. As described herein, depending on the operational state of the vehicle (e.g., the acceleration demands of the driver, the state of charge of the energy storage device 128, the speed of the vehicle, etc.), the powertrain 100 may switch between such operating modes to meet driver acceleration/deceleration demands while maintaining a relatively high driving efficiency.

Referring still to FIG. 1, the powertrain 100 further includes a vehicle control unit 200 communicably coupled to the engine 102, engine clutch 110, electric machine 104, transmission 114, and friction brakes 130 (as indicated by the double-sided arrows in FIG. 1). While the vehicle control unit 200 is depicted as only a single component, it should be understood that the vehicle control unit 200 described herein may include any number of separate components depending on the implementation. For example, any distributed control scheme, where separate controllers are used to control the operation of any of the components depicted in FIG. 1 individually or in any combination may be used in accordance with the present disclosure. The vehicle control unit 200 is configured to control the operation of the components of the powertrain 100 (e.g., the engine 102, engine clutch 110, electric machine 104, transmission 114, and friction brakes 130) depending on the current driving conditions of the vehicle and various inputs 132.

In embodiments, the inputs 132 include one or more driver input devices (e.g., an accelerator pedal, a braking pedal, and the like), one or more internal sensors (e.g., detectors monitoring rotational speeds of the engine 102 and the electric machine 104, detectors monitoring the state of charge of the energy storage device 128, sensors monitoring the current operational state or gear ratio of the transmission 114, sensors monitoring an amount of braking force being applied by the friction brakes 130, sensors monitoring the speed of the vehicle, and the like), and one or more external sensors (e.g., cameras or ranging systems detecting the presence of traffic, vehicle-to-vehicle communications systems, information received via a network interface). In embodiments, the vehicle control unit 200 comprises a state machine configured to select and switch between the operating modes (e.g., hybrid driving, electric driving, and regenerative braking) described herein depending on the inputs 132.

Figure 2A:
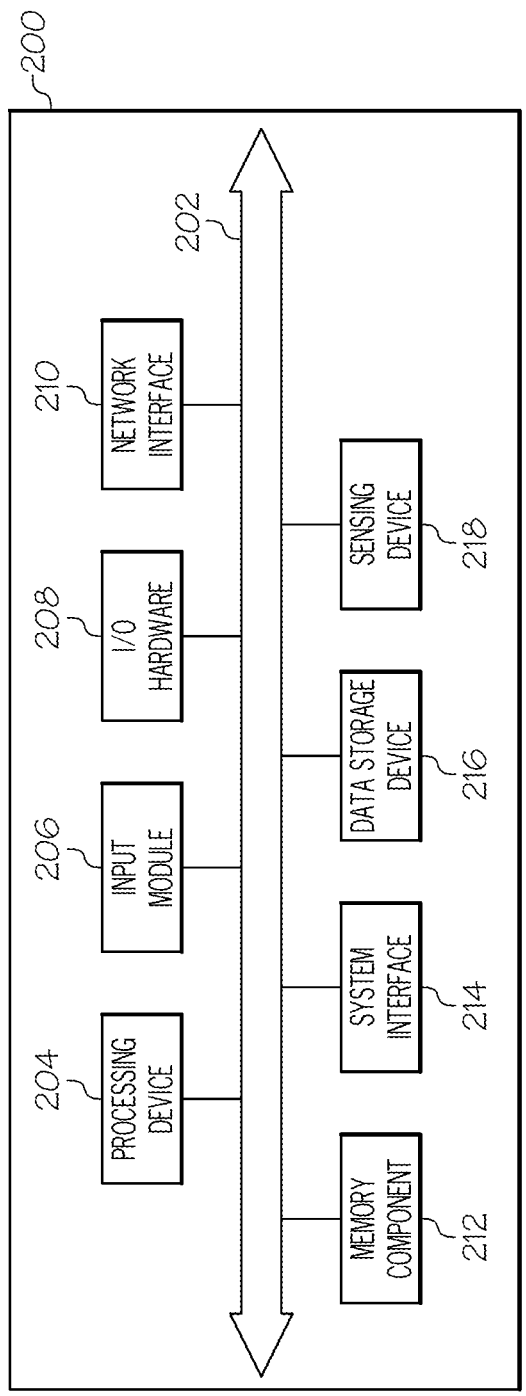
FIG. 2A schematically depicts a block diagram of the vehicle control unit of the powertrain depicted in FIG. 1, according to one or more embodiments described herein.

FIG. 2A schematically depicts illustrative hardware components of the vehicle control unit 200 in greater detail. In embodiments, the vehicle control unit 200 is an onboard vehicle computing system. In in embodiments, the vehicle control unit 200 is a plurality of vehicle computing systems.

In the embodiment depicted in FIG. 2A, the vehicle control unit 200 includes a processing device 204, an input module 206, I/O hardware 208, a network interface hardware 210, a non-transitory memory component 212, a system interface 214, a data storage device 216, and a sensing device 218. In embodiments, a local interface 202, such as a bus or the like, interconnect the various components. In embodiments, the processing device 204, such as a computer processing unit (CPU), is the central processing unit of the electronic control unit 200, performing calculations and logic operations to execute a program. The processing device 204, alone or in conjunction with the other components, is an illustrative processing device, computing device, processor, or combination thereof. In some embodiments, the processing device 204 includes any processing component configured to receive and execute instructions (such as from the data storage device 216 and/or the memory component 212).

In embodiments, the memory component 212 is configured as a volatile and/or a nonvolatile computer-readable medium and, as such, include random access memory (including SRAM, DRAM, and/or other types of random access memory), read only memory (ROM), flash memory, registers, compact discs (CD), digital versatile discs (DVD), and/or other types of storage components. In embodiments, the memory component 212 includes one or more programming instructions thereon that, when executed by the processing device 204, cause the processing device 204 to complete various processes described herein. In embodiments, the programming instructions stored on the memory component 212 are embodied as a plurality of software logic modules, where each logic module provides programming instructions for completing one or more tasks, as described in greater detail below with respect to FIG. 2B.

In some embodiments, the network interface hardware 210 includes any wired or wireless networking hardware, such as a modem, a LAN port, a wireless fidelity (Wi-Fi) card, WiMax card, mobile communications hardware, and/or other hardware for communicating with other networks and/or devices. For example, in some embodiments, the network interface hardware 210 provides a communications link between the vehicle control unit 200 and the other components of the network (not shown). In embodiments, the data storage device 216 is a storage medium that contains one or more data repositories for storing data that is received and/or generated. In embodiments, the data storage device 216 is any physical storage medium, including, but not limited to, a hard disk drive (HDD), memory, removable storage, and/or the like. While the data storage device 216 is depicted as a local device, it should be understood that, in some embodiments, the data storage device 216 is a remote storage device. The I/O hardware 208 communicates information between the local interface 202 and one or more other components of the vehicle. For example, the I/O hardware 208 acts as an interface between the vehicle control unit 200 and other components, such as navigation systems, meter units, sensors, mobile phone systems, infotainment systems, and/or the like. In some embodiments, the I/O hardware 208 is utilized to transmit one or more commands to the other components of the vehicle. In embodiments, the system interface 214 generally provides the vehicle control unit 200 with an ability to interface with one or more external devices such as, for example, the network. In some embodiments, communication with external devices occurs using various communication ports. In some embodiments, an illustrative communication port is attached to a communications network.

Still referring to FIG. 2A, in embodiments, the sensing device 218 is communicatively coupled to the local interface 202 and coupled to the processing device 204 via the local interface 202. In some embodiments, the sensing device 218 is any imaging device or a detector that is suitable for obtaining data relating to the lead vehicle operating conditions, such as motion data. As used herein, the term "lead vehicle operating condition" refers to a lead vehicle location data, a lead vehicle motion data including velocity, a current speed limit data, a current traffic conditions data, a plurality of weather conditions, and/or the like. In some embodiments, any suitable commercially available sensing device 218 is used without departing from the scope of the present disclosure.

Figure 2B:
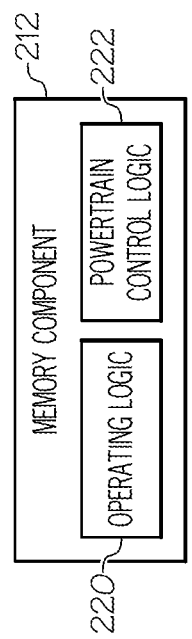
FIG. 2B schematically depicts a block diagram of a memory component of the vehicle control unit depicted in FIG. 2A, according to one or more embodiments described herein.

With reference to FIG. 2B, in embodiments, the program instructions contained in the memory component 212 is embodied as a plurality of software modules within illustrative logic components according to one or more embodiments shown and described herein. Each software module provides programming instructions for completing one or more tasks. For example, as shown in FIG. 2B, in some embodiments, the memory component 212 contains operating logic 220 and powertrain control logic 222. In embodiments, the operating logic 220 includes an operating system and/or other software for managing components of the vehicle control unit 200 (FIG. 2A). Further, in some embodiments, the operating logic 220 contains one or more software modules for transmitting data and/or analyzing data.

In embodiments, the powertrain control logic 222 comprises one or more modules configured to select from a number of operating states of the various components of the powertrain 100 (e.g., the engine 102, engine clutch 110, electric machine 104, transmission 114, and friction brakes 130, see FIG. 1) based on the inputs 132 and/or sensing device 218. In embodiments, for example, the powertrain control logic 222 controls an output torque of the engine 102 and/or electric machine 104 responsive to a position of an accelerator petal to respond to driver acceleration demands. The manner with which the operation of the powertrain 100 is controlled via the powertrain control logic 222 may vary depending on a current operational mode of the powertrain 100. Accordingly, in embodiments, the powertrain control logic 222 comprises one or more modules that controls the engine clutch 110 based on the operating conditions of the vehicle to determine whether the powertrain 100 is operating in an electric driving mode, a hybrid driving mode, or a regenerative braking driving mode.

In embodiments, the powertrain control logic 222 comprises modules to cause shifting of the transmission 114 between a plurality of gear ratios based on or more shifting schedules. For example, in embodiments, the powertrain control logic 222 causes the processing device 204 to execute instructions to monitor the current operational state of the transmission 114 and the torque provided via the input shaft 112. Based on such information, the vehicle control unit 200 may shift the transmission 114 between gear ratios (e.g., either upshift or downshift) depending on a relationship between a current speed of the vehicle and a future desired speed of the vehicle (e.g., determined based on a compression of the accelerator pedal). In embodiments, the gear ratio in each shifting schedule of the transmission 114 has torque limits associated therewith, and the powertrain control logic 222 changes the gear ratio as such torque limits are reached and a desired amount of torque is provided to the driveshaft 118. In embodiments, the particular shifting schedule employed to control the transmission 114 is determined based on a current driving mode of the powertrain 100. For example, as described herein, the powertrain control logic 222 may including different shifting points for when the powertrain 100 is operated in a regenerative braking mode than when in a hybrid driving mode.

In embodiments, the powertrain control logic 222 utilizes an engine start limit in determining an operating mode for the powertrain 100. In embodiments, the engine start limit comprises a threshold difference in rotational speed between the input shaft 112 (see FIG. 1) and the output shaft 106. The engine start limit may be determined based at least in part on physical characteristics of the engine clutch 110. For example, in embodiments, the engine start limit represents a rotational speed of the input shaft 112 above which switching the engine clutch 110 from an open state to a closed state would cause component damage to the engine clutch 110. When operating in an electric driving mode where the engine clutch 110 is open and the rotational speed of the input shaft 112 reaches the engine start limit, the powertrain control logic 222 may cause the processing device 204 to issue commands to close the engine clutch 110 and start the engine 102 to increase the rotational speed of the output shaft 106, thereby ensuring the difference is beneath the engine start limit. An example of when such a control sequence may occur is if the vehicle is travelling downhill and the engine clutch 110 is open. The incline may cause the rotational speed of the input shaft 112 (e.g., via the transmission 114) to increase to the engine start limit irrespective of driver acceleration demands. Such closure of the engine clutch 110 may facilitate responsiveness of the engine 102 to subsequent acceleration demands of the driver (by avoiding the need for later up-shifts in the transmission 114) while avoiding component damage.

Figure 3:
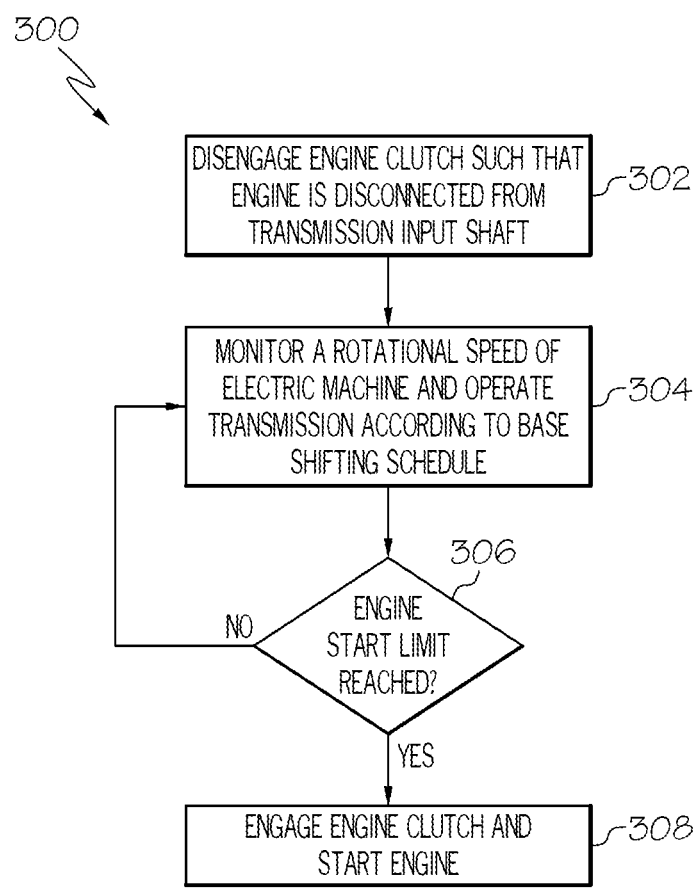
FIG. 3 depicts a flow diagram of an illustrative method of switching the powertrain depicted in FIG. 1 from an electric vehicle mode to a hybrid vehicle mode, according to one or more embodiments described herein.

FIG. 3 depicts a flow diagram of a method 300 implementing such an engine start limit. In embodiments, the powertrain control logic 222 may cause the processing device 204 of the vehicle control unit 200 to implement the method 300 by controlling various components of the powertrain 100 described herein with respect to FIG. 1. At block 302, the vehicle control unit 200 may cause the engine clutch 110 to become disengaged such that the engine 102 is disconnected from the input shaft 112. In embodiments, when acceleration demands may be met solely using the electric machine 104 and the energy storage device 128 possesses the requisite state of charge, the vehicle control unit 200 (e.g., via the powertrain control logic 222) may initiate an electric driving or regenerative braking mode (depending on whether an acceleration demand is present) and disengage the engine clutch 110. For instance, once the vehicle has reached a desired speed, the driver may depress the accelerator pedal and, in response to determining that the electric machine 104 is capable of maintaining the vehicle at the desired speed, the vehicle control unit 200 may disengage the engine clutch 110. In another example, the vehicle control unit 200 may disengage the engine clutch 110 in response to the driver pressing a brake pedal for more than a predetermined period.

At block 304, the vehicle control unit 200 monitors a rotational speed of the electric machine 104 and operates the transmission 114 according to a base shifting schedule. For example, in embodiments, the sensing device 218 includes a sensor monitoring a rotational speed of the input shaft 112 when the engine clutch 110 is disengaged to determine the rotational speed of the electric machine 104. Based on the torque input to the transmission 114 via the input shaft 112, the vehicle control unit 200 may shift the gear ratio of the transmission 114 to rotate the driveshaft 118 to meet acceleration demands. The vehicle control unit 200 may upshift or downshift the gear ratio of the transmission based on a plurality of rotational speed thresholds of the input shaft 112 depending on the current operational state of the vehicle.

In embodiments, the base shifting schedule may be determined based at least in part on an engine start limit. For example, the shifting points of the transmission 114 may be determined such that, after downshifting, the rotational speeds of the input shaft 112 are less than the engine start limit. Such a shifting schedule beneficially ensures that the engine clutch 110 may be instantaneously closed to engage the output shaft 106 with the input shaft 112 responsive to increased acceleration demands. By ensuring that downshifting the transmission 114 results in a rotational speed of the input shaft 112 that is less than or equal to the engine start limit, the base shifting schedule prevents damage to the engine clutch 110 while avoiding delays in permitting the engine 102 to contribute to the torque of the input shaft 112. In embodiments, the engine start limit comprises a single value (e.g., greater than or equal 1200 revolutions per minute, greater than or equal 1300 revolutions per minute, greater than or equal 1400 revolutions per minute, greater than or equal 1500 revolutions per minute, greater than or equal 1600 revolutions per minute, greater than or equal 1700 revolutions per minute, greater than or equal 1800 revolutions per minute) that is determined based on the construction of the engine clutch 110.

At block 306, the vehicle control unit 200 determines whether the engine start limit has been reached. In embodiments, for example, shifting of the transmission 114 may not be able to prevent the rotational speed of the input shaft 112 from reaching the engine start limit. If the transmission 114 is at a highest gear ratio, for example, the input shaft 112 may reach the engine start limit without any higher gear ratios being available to reduce rotation. An example scenario where this may occur is if the vehicle is travelling downhill. In such a case where the engine start limit is reached, the vehicle control unit 200 may engage the engine clutch 110, thereby starting the engine at block 308. Starting the engine increases the rotational speed of the output shaft 106, thereby reducing the difference in rotational speed between the input shaft 112 and the output shaft 106 and avoiding potential component damage to the engine clutch 110. When not operating in the regenerative braking mode described herein, the vehicle control unit 200 may cause rotation of the electric machine 104 above the engine start limit to trigger starting of the engine 102 by engaging the engine clutch 110.

Referring again to FIG. 2B, the powertrain control logic 222 of the vehicle control unit 200 may also include regenerative braking logic. Via the regenerative braking logic, the vehicle control unit 200 may apportion total wheel braking torque between a regenerative braking torque generated via the electric machine 104 and a friction braking torque generated via friction brakes 130. For example, in response to the driver pressing the brake pedal, the vehicle control unit 200 may determine a total braking torque needed to decelerate the vehicle. The total braking torque may be apportioned between regenerative braking torque generated by the electric machine 104 (e.g., the electric machine converts kinetic energy of the input shaft 112 into electrical energy and provides such electrical energy to the energy storage device 128) and torque generated by the friction brakes 130.

Figure 4A:
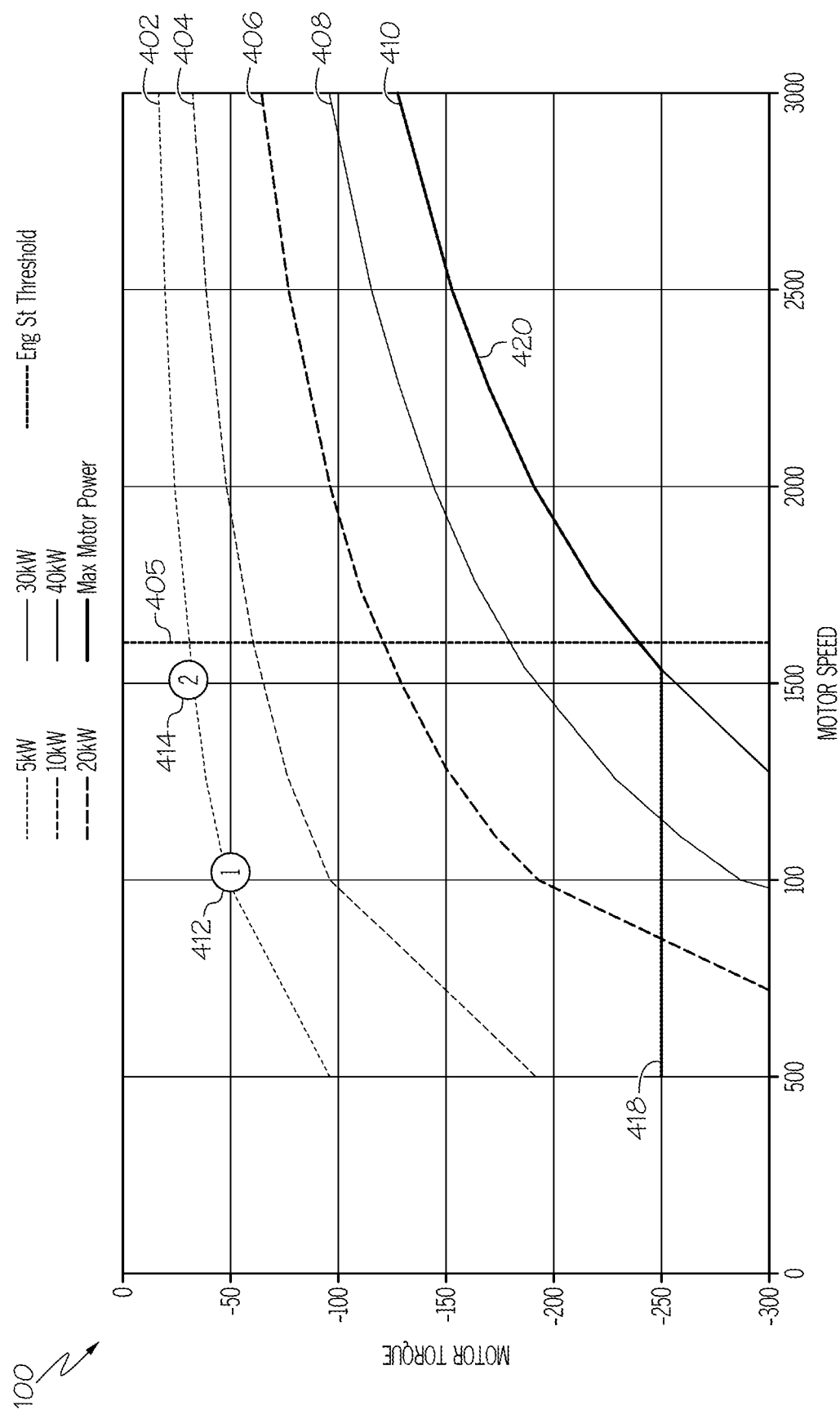
FIG. 4A depicts a first electric machine power graph for the electric machine of the powertrain depicted in FIG. 1, according to one or more embodiments described herein.
Figure 4B:
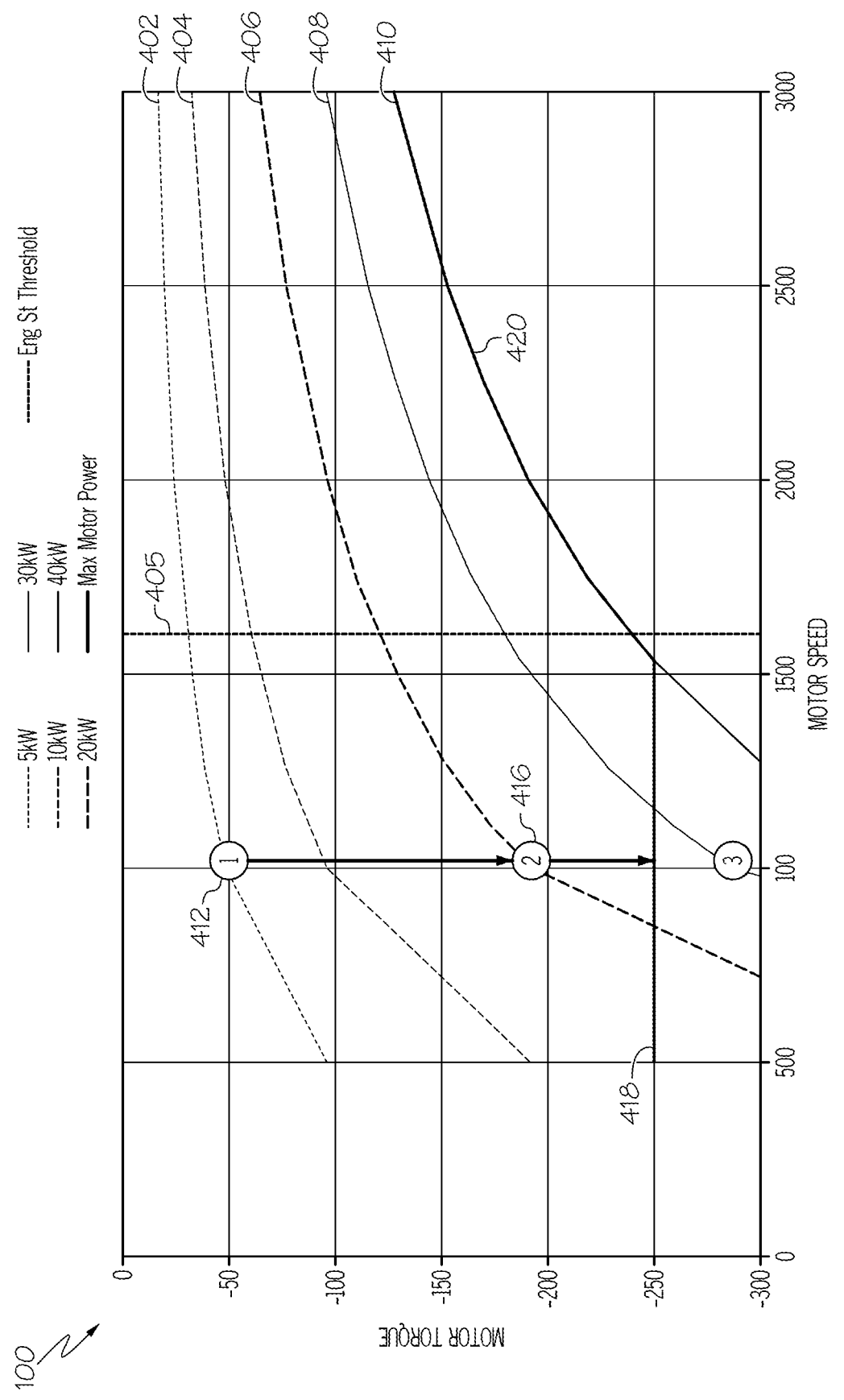
FIG. 4B depicts a second electric machine power graph for the electric machine of the powertrain depicted in FIG. 1, according to one or more embodiments described herein.
Figure 4C:
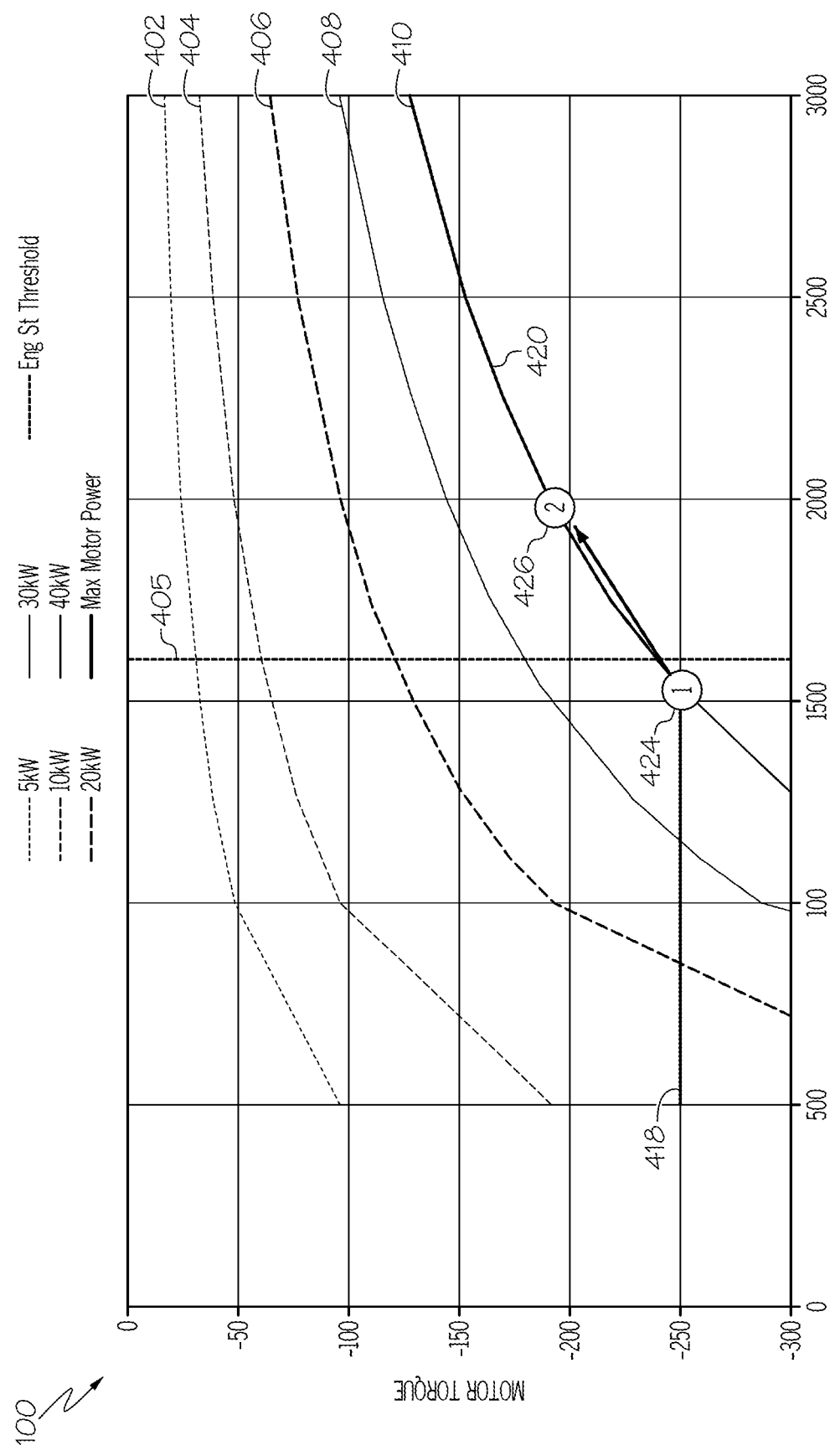
FIG. 4C depicts a third electric machine power graph for the electric machine of the powertrain depicted in FIG. 1, according to one or more embodiments described herein.

In embodiments, the regenerative braking torque generated via the electric machine 104 increases in proportion to the total braking torque desired by the driver (e.g., in proportion to the brake pedal pressure) until a maximum torque is reached. FIGS. 4A-4C depict a plot 400 including a plurality of power curves 402, 404, 406, 408, and 410 in different braking sequences for the powertrain 100. Various components depicted in FIGS. 1, 2A, and 2B, will be used to aid in the description of FIGS. 4A-4C. The X-axis for each of the power curves 402, 404, 406, 408, and 410 represents the rotational speed of the input shaft 112 (in revolutions per minute), while the Y-axis represents a torque generated via the electric machine 104. Each of the power curves 402, 404, 406, 408 and 410 indicates an amount of torque generated by the electric machine 104 at a given rotational speed, when operated to generate a given amount of electrical power used to charge the energy storage device 128. FIGS. 4A-4C depict an engine start limit 405 of approximately 1600 revolutions per minute. In embodiments, when the engine start limit 405 is reached, closure of the engine clutch 110 is initiated, as described with respect to FIG. 3. FIGS. 4A-4C also depict a maximum electric machine torque 418. At relatively low operating speeds (e.g., less than or equal to 1500 revolutions per minute in the depicted example), the electric machine 104 is capable of generating the maximum electric machine torque 418. Above a threshold rotational speed, the maximum electric machine torque 418 decreases as the electric machine 104 is operated along a maximum power curve 420.

FIG. 4A depicts a first point 412 on the first power curve 402. The first power curve 402 represents a relatively low power level of the electric machine 104 (e.g., 5 kW). The vehicle control unit 200 may operate the electric machine 104 on the first power curve 402 in response to relatively low torque demands (e.g., corresponding to an instance in which the driver does not depress the brake pedal and the vehicle is coasting without any slowdown caused via friction brakes 130). A second point 414 on the first power curve 402 may represent a rotational speed of the electric machine 104 after down-shifting of the transmission 114 (e.g., the input shaft 112 may reach a threshold for downshifting of the transmission 114 in accordance with the base shifting schedule described herein). As depicted, even after downshifting, the rotational speed of the electric machine 104 may remain beneath the engine start limit 405.

FIG. 4B depicts the first point 412 on the first power curve 402 and a second point 416 on the third power curve 406. In embodiments, the vehicle control unit 200 may shift operation of the electric machine 104 from the first power curve 402 to the third power curve 406 responsive to increased regenerative braking torque demands from the driver. For example, upon releasing the accelerator pedal, the electric machine 104 may initially be operated on the first power curve 402. In response to the driver depressing the brake pedal in a manner that meets a predetermined threshold (e.g., a predetermined brake pedal position, a brake pedal pressure gradient, etc.), the vehicle control unit 200 may switch operation of the electric machine 104 to the third power curve 406 to provide an increased amount of torque at the current rotational speed thereof. In this example, an entirety of the increased torque demand may be met by switching the operating power level of the electric machine 104. To shift from the first point 412 to the second point 416, the vehicle control unit 200 may alter the operation of the electric machine 104 to increase the regenerative braking torque without altering an operational state of the transmission 114. Such a transition to a third point 422 on the fourth power curve 408 is not within the capabilities of the electric machine 104 in the depicted example, as the required electric machine torque is above the maximum electric machine torque 418. Such excess over the maximum electric machine torque 418 may be completely apportioned to the friction brakes 130, but such a strategy results in suboptimal regenerative braking efficiency, as the electric machine 104 is not operating on the maximum power curve 420 in the depicted example.

To improve an regenerative braking efficiencies during driving events associated with relatively large vehicle decelerations (e.g., when the vehicle is going to come to a complete stop or when the vehicle speed decreases by more than a predetermined threshold such as at least 25 miles per hour), the vehicle control unit 200 may downshift the transmission 114 during regenerative braking to increase rotational speed of the electric machine 104 such that the electric machine 104 is operated on the maximum power curve 420. Any excess breaking torque required above the torque along the maximum power curve 420 may be apportioned to the friction brakes 130.

When initiating regenerative braking from relatively high vehicle speeds (e.g., greater than or equal to 25 miles per hour), however, such downshifting of the transmission 114 may result in the rotational speed of the input shaft 112 increasing above engine start limit 405. For example, FIG. 4C depicts a fourth point 424 on the fifth power curve 410. The fourth point 424 corresponds to a relatively large regenerative torque demand while the vehicle is travelling at a relatively high speed. For example, the driver may depress the braking pedal by a substantial amount indicating an intent to substantially reduce the vehicle speed. To increase the energy recaptured by the electric machine 104, the transmission 114 may be down-shifted to increase the rotational speed of the electric machine 104 to the fifth point 426 on the fifth power curve 410. As depicted in FIG. 4C, the fifth point 426 corresponds to a rotational speed above the engine start limit 405. As described herein with respect to FIG. 3, the base shifting schedule for the transmission 114 may avoid downshifting that results in rotational speeds above the engine start limit 405. As a result, continued use of the base shifting schedule may result in delaying down shifts (e.g., shifting from the fourth point 424) until the vehicle speed is reduced to a great enough extent such that the down shift results in a rotational speed beneath the engine start limit 405. Such delays reduce the amount of time that the electric machine 104 is operating along the maximum power curve 420, resulting in over-apportionment to the friction brakes 130 and sub-par regenerative braking efficiency.

In view of the foregoing, the vehicle control unit 200 may operate the transmission 114 using modified shifting points during regenerative braking events associated with relative large vehicle decelerations. To facilitate the shift between the fourth and fifth points 424 and 426 depicted in FIG. 4C, for example, the powertrain control logic 222 (see FIG. 2B) may initiate control of the transmission 114 in accordance with a modified shifting schedule where the shifting points result in the rotational speed of the input shaft 112 above the engine start limit 405. Such shifting points beneficially increase the amount of time the electric machine 104 is operated along the maximum power curve 420 by avoiding downshifting delays, thereby increasing the amount of power generated during regenerative braking over existing vehicles adhering to a base shifting schedule.

Figure 5:
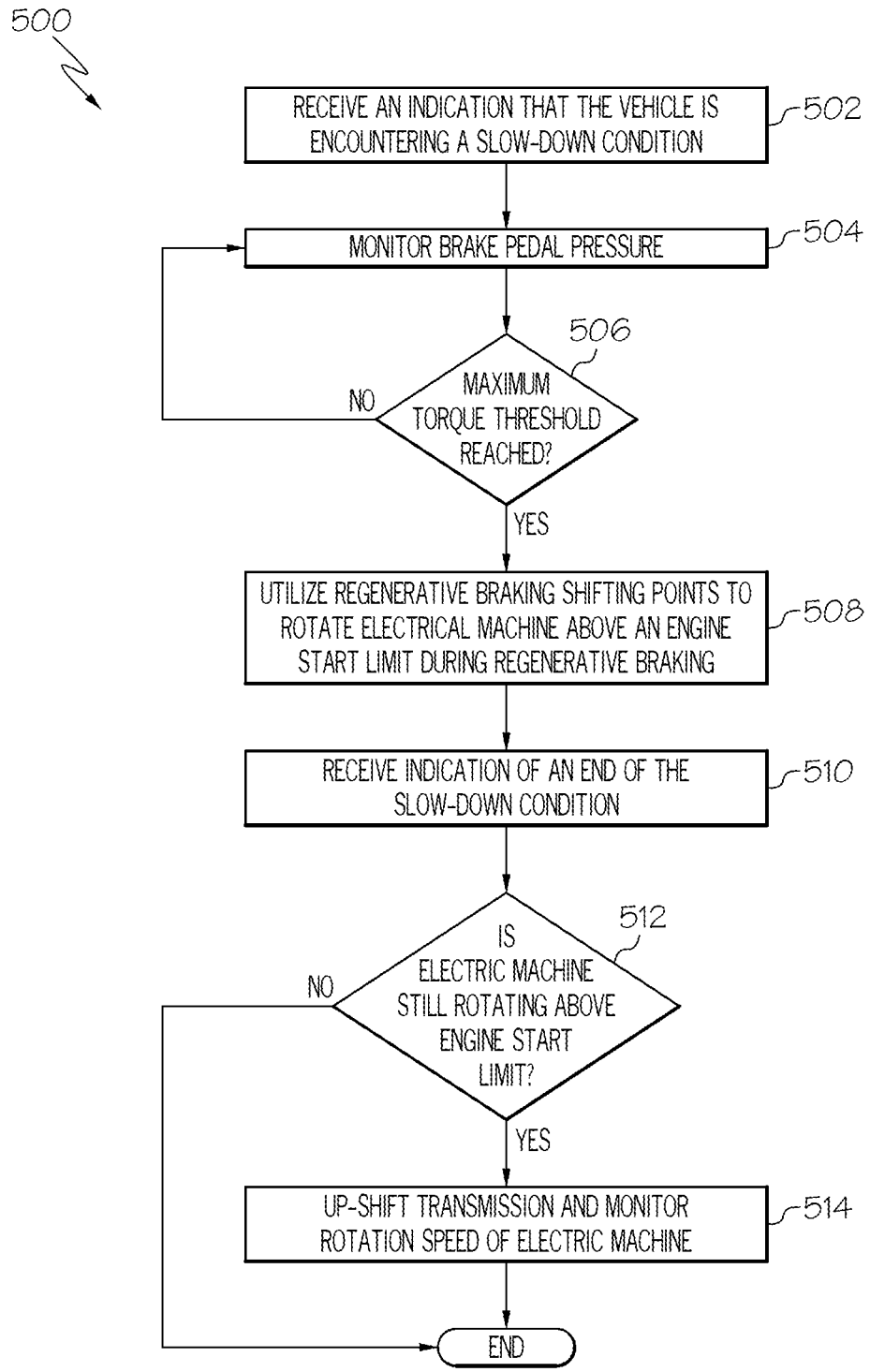
FIG. 5 depicts a flow diagram of an illustrative method of controlling a rotational speed of an electric machine of the powertrain depicted in FIG. 1 above an engine start limit during regenerative braking, according to one or more embodiments described herein.

FIG. 5 depicts a flow diagram of a method 500 of operating a powertrain of a hybrid-electric vehicle to operate an electric machine thereof at rotational speeds above an engine start limit to achieve relatively high regenerative braking efficiencies. In embodiments, the method 500 is implemented via the vehicle control unit 200 of the powertrain 100 described herein. Accordingly, reference will be made to various components described herein with respect to FIGS. 1, 2A, and 2B to aid in the description of the method 500. Method 500 may generally be performed in any instance where deceleration of the vehicle may not entirely be accomplished via the electric machine 104. The operational state of the powertrain 100 may vary depending on the circumstances prior to initiation of the method 500. For example, in embodiments, the method 500 may be initiated when the powertrain 100 is operating in a hybrid mode in which both the engine 102 and the electric machine 104 are supplying torque to the transmission 114. In embodiments, the method 500 may be initiated when the engine 102 or the electric machine 104 are operating as a sole propulsive source of the powertrain 100. In embodiments, the vehicle may already be decelerating prior to initiation of the method 500. For example, the method 500 may initiate when the vehicle is coasting and some amount of regenerative braking is already occurring (e.g., the electric machine 104 may be operating in a state similar to that described with respect to the first point 412 described herein with respect to FIG. 4A).

At block 502, the vehicle control unit 200 receives an indication that the vehicle is encountering a slow-down condition. In embodiments, the indication corresponds to the driver releasing the accelerator pedal of the vehicle. In embodiments the indication includes the driver depressing the brake pedal of the vehicle. In embodiments, the vehicle control unit 200 evaluates a plurality of the inputs 132 simultaneously to determine if the indication of the slow-down condition is present. For example, in embodiments, the indication corresponds to both a complete release of the accelerator pedal and a pressing of the braking pedal.

In embodiments, the vehicle control unit 200 evaluates inputs other than the accelerator and brake pedals to determine whether the indication of the slow-down condition is present. For example, in embodiments, the vehicle control unit 200 only advances if an indication of a slow-down condition where the vehicle speed is predicted to decrease by more than a predetermined amount (e.g., greater than or equal to 25 miles per hour) within a predetermined period is received. As described herein with respect to FIGS. 4A-4C, the vehicle control unit 200 may operate the electric machine 104 to generate regenerative braking torques that are responsive to driver deceleration demands. In certain instances (e.g., when initial vehicle speeds are relatively slow or where deceleration demands are relatively low), the electric machine 104 may be capable of generating such torques without altering the transmission shifting schedule. Accordingly, in embodiments, to proceed with the method 500, the vehicle control unit 200 may evaluate the indication received at block 502 against predetermined criteria to determine whether altering shifting points of the transmission 114 is potentially desired to accommodate driver deceleration demands.

In embodiments, the predetermined criteria against which the indication received at block 502 are evaluated are based solely on the brake pedal. For example, in embodiments, the vehicle control unit 200 may evaluate a rate of change of the brake pedal position and the absolute brake pedal position. If the rate of change or absolute position of the brake pedal meet predetermined criteria (e.g., exceed predetermined thresholds), a slow-down condition associated with substantial vehicle acceleration may be indicated and the method 500 may advance. In embodiments, the vehicle control unit 200 interprets data from multiple inputs 132 (see FIG. 1) to evaluate whether an indication of a slow-down condition is present. For example, the vehicle control unit 200 may initially monitor the accelerator and brake pedals for an initial indication of the slow-down condition (e.g., corresponding to the driver releasing the accelerator pedal and applying pressure to the brake pedal) and monitor additional inputs for a confirmation of a slow-down condition associated with substantial vehicle deceleration (e.g., reduction in speed by at least 25 miles per hour). Such a confirmation may take a variety of different forms, depending on the implementation. For example, in embodiments, the confirmation is received via the sensing device 218 associated with the vehicle control unit 200 (see FIG. 2A). For example, the sensing device 218 may comprise a camera or ranging system configured to detect driving conditions (e.g., associated with other vehicles). Based on data generated via the sensing device 218, for example, the vehicle control unit 200 may determine that other vehicles in front of the vehicle are travelling at a speed that is lower than the vehicle, indicating a need to slow down the vehicle. In embodiments, the vehicle control unit 200 may determine the presence of traffic signs or signals based on the data generated via the sensing device 218. For example, detection of a stop sign or the like may serve as the confirmation of the slow-down condition.

In embodiments, the confirmation of the slow-down condition may be received via the network interface hardware 210 or I/O hardware 208. For example, in embodiments, the vehicle control unit 200 may receive information from a vehicle-to-vehicle communication system (e.g., information from other vehicles regarding the speed of the other vehicles and other operational state information) or a vehicle-to-infrastructure communication system (e.g., information regarding an upcoming traffic sign or signal). Such information may indicate a necessary slow-down of the vehicle and serve as the confirmation of the slow-down condition (e.g., in addition to driver behavior). In embodiments, the confirmation of the slow-down condition may be generated via the vehicle control unit 200 analyzing historical driver behavior data (e.g., a database of driver tendencies may be maintained in the data storage device 216).

At block 504, once the indication of the slow-down condition is received, the vehicle control unit 200 monitors a brake pedal pressure. As described herein, once the vehicle begins decelerating, the vehicle control unit 200 may apportion braking torque between the electric machine 104 and the friction brakes 130 to generate a total braking torque that corresponds to driver demands. When a brake pedal is minimally depressed, for example, the vehicle control unit 200 may disengage the engine clutch 110 and operate the electric machine 104 to generate a relatively low amount of power (e.g., along a power curve similar to the first power curve 402 described herein with respect to FIGS. 4A-4C) and slow down the vehicle. The regenerative braking torque generated via the electric machine 104 may be increased responsive to the driver depressing the brake pedal until a maximum torque (e.g., similar to the maximum electric machine torque 418 described herein with respect to FIGS. 4A-4C) is reached. Accordingly, block 506 is a decision block indicating that the vehicle control unit 200 monitors the brake pedal pressure until the maximum torque threshold is reached.

At block 508, once the maximum torque threshold is reached, the vehicle control unit 200 operates the transmission 114 in accordance with regenerative braking shifting points to rotate the electric machine 104 above an engine start limit during regenerative braking. In embodiments, the regenerative braking shifting points are only used if the electric machine speed (e.g., corresponding to the speed of the input shaft 112 when the engine clutch 110 is disengaged) is above a predetermined threshold such that downshifting of the transmission 114 would result in the input shaft 112 rotating above the engine start limit. If the speed of the vehicle is relatively low, for example, downshifting of the transmission 114 may result in the input shaft 112 rotating beneath the engine start limit, rendering the modified shifting schedule unnecessary. The regenerative braking shifting points may be used where the electric machine 104 is operating in situations similar to the fourth point 424 depicted in FIG. 4C, where the electric machine 104 is operating at the maximum electric machine torque 418 at a rotational speed that is proximate to the engine start limit. The regenerative braking shifting points may generally operate the electric machine 104 along a maximum power curve (e.g., similar to the maximum power curve 420 described herein with respect to FIGS. 4A-4C). That is, the transmission 114 may be down-shifted when doing so would result in the electric machine 104 maintaining operation on the maximum power curve thereof. Remaining braking torque requested from the driver may be apportioned to the friction brakes 130.

At block 510, the vehicle control unit 200 receives an indication of an end of the slow-down condition. In embodiments, the indication comprises a driver releasing the brake pedal. For example, the vehicle control unit 200 may monitor the brake pedal position. The brake pedal reaching a predetermined position threshold or a rate of change of the brake pedal position reaching a predetermined threshold may comprise the indication of the end of the slow-down condition. In embodiments, the indication may comprise additional inputs 132 (e.g., from a camera, a ranging system, or vehicle communication system). In embodiments, the indication comprises a driver pressing an accelerator pedal to indicate a desire to increase the speed of the vehicle. In embodiments, once the indication of the end of the slow-down condition is received, the regenerative braking mode may be inactivated such that the vehicle control unit 200 causes rotation of the electric machine 104 above the engine start limit to trigger starting the engine 104.

At block 512, the vehicle control unit 200 determines whether the electric machine 104 is still rotating above the engine start limit. If the input shaft 112 is rotating below the engine start limit when the indication of the end of the slow-down condition is received at block 510, the method 500 may end and the transmission 114 may be returned to operation in accordance with base shifting points. If the input shaft 112 is rotating above the engine start limit when the indication of the end of the slow-down condition is received at block 510, however, closure of the engine clutch 110 may result in component damage. Accordingly, if the electric machine 104 is still rotating above the engine start limit, the vehicle control unit 200 may upshift the gear ratio of the transmission 114 at block 514 to reduce the rotational speed of the input shaft beneath the engine start limit. This way, the engine clutch 110 may be closed responsive to driver acceleration demands without component damage, and the powertrain 100 may smoothly transition from the regenerative braking mode to the hybrid driving mode described herein.

Figure 6:
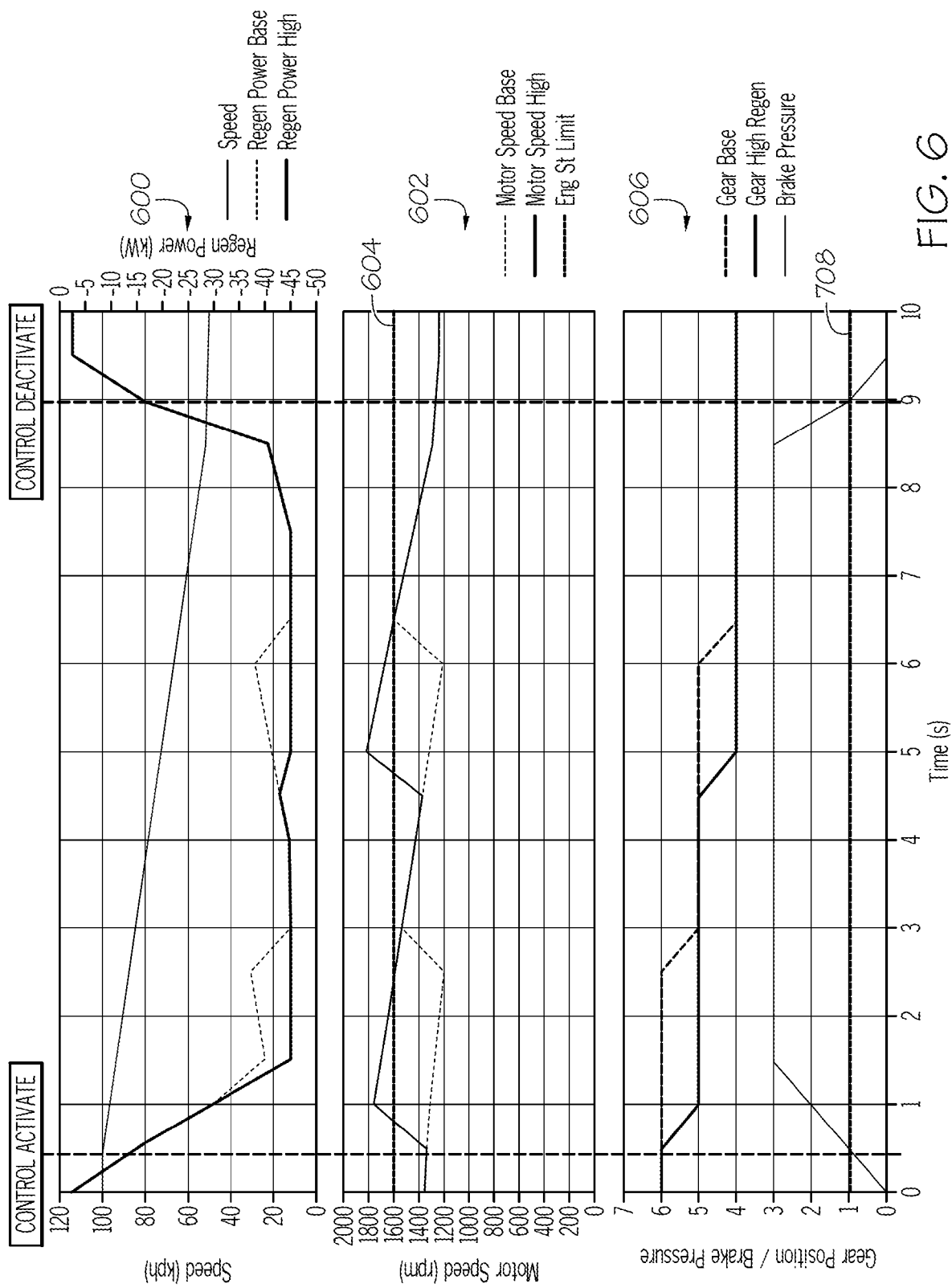
FIG. 6 depicts an example control sequence timeline for the powertrain depicted in FIG. 1, in which a transmission of a hybrid-electric vehicle is operated using regenerative braking shifting points to maintain a rotational speed of an electric machine above an engine start limit, according to one or more embodiments described herein.

FIG. 6 depicts an example control timeline for the powertrain 100 when the vehicle control unit 200 is implementing the method 500 described herein. Various components of the powertrain 100, described herein with respect to FIGS. 1, 2A, 2B, will be referred to herein to aid in describing the control timeline depicted in FIG. 6. A first plot 600 indicates a power generated by the electric machine 104 as a function of time and depicts a speed of the vehicle in both a base case, where the shifting points of the transmission 114 are un-modified, and a modified case, where the shifting points of the transmission 114 are modified to rotate electric machine above an engine start limit 604. A second plot 602 depicts rotational speeds of the electric machine 104 in both the base and modified cases. A third plot 606 depicts the brake pedal pressure as a function of time, as well as the gear ratio of the transmission in both the base and modified cases. As depicted in the third plot 606, the vehicle control unit 200 utilizes a threshold brake pedal pressure 708 to activate and de-activate modification of the shifting points described herein. In embodiments, the brake pedal pressure being above the threshold brake pedal pressure 708 may indicate that a maximum torque line of the electric machine 104 has been reached. Release of the brake pedal pressure beneath the threshold brake pedal pressure 708 may serve as the indication of the end of the slow-down condition at block 510 of the method 500 described herein.

As shown in the third plot 606, as a result of the modified shifting points associated with the method 500 described herein, the transmission 114 is downshifted from gear 6 to gear 5 at a time of approximately 1 second in the modified case. This contrasts with the base case (where the shifting schedule of the transmission 114 is un-modified), where the downshifting occurs at about 2.5 seconds. As depicted in the second plot 602, such early shifting results in the rotational speed of the electric machine 104 being above the engine start limit 604, which results in operation of the electric machine 104 along the maximum power line (indicated by the relatively flat power output of the electric machine 104 in the central portion of the first plot 600). The modified shifting schedule results in increased power generation over the base case, improving regenerative braking efficiency. As depicted in the third plot 606, operation of the transmission 114 in accordance with the modified shifting schedule results in two down-shifts of the transmission at earlier points in time than the base case to rotate the electric machine 104 above the engine start limit 604. Once the brake pedal pressure is released beneath the threshold brake pedal pressure 708, the control logic ends.

Figure 7:
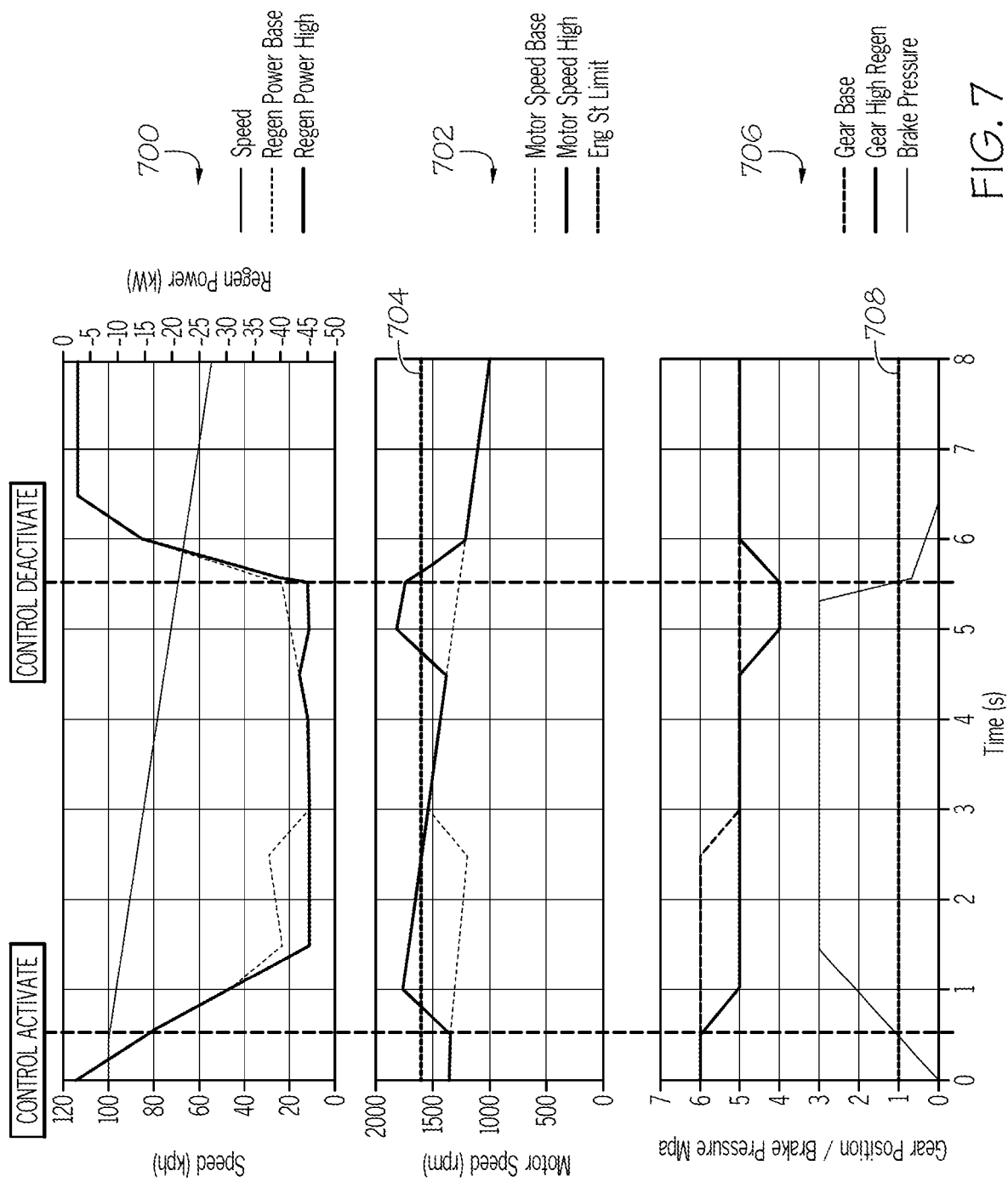
FIG. 7 depicts an example control sequence timeline for the powertrain depicted in FIG. 1, in which a transmission of the hybrid-electric vehicle is upshifted after the hybrid-electric vehicle exits a regenerative braking mode to bring a rotational speed of the electric machine beneath the engine start limit, according to one or more embodiments described herein.

FIG. 7 depicts another example control timeline for the powertrain 100 when the vehicle control unit 200 is implementing the method 500 described herein. Various components of the powertrain 100, described herein with respect to FIGS. 1, 2A, 2B, will be referred to herein to aid in describing the control timeline depicted in FIG. 6. FIG. 7 depicts the same plots 600, 602, and 606 described with respect to FIG. 6. As depicted in the third plot 606, once the brake pedal pressure reaches the threshold brake pedal pressure 708, the transmission 114 is downshifted to cause rotation of the electric machine 104 above the engine start limit 604. As illustrated in the second plot 602, once the vehicle speed decreases and the rotational speed of the electric machine 104 decreases beneath the engine start limit 604, the transmission 114 is down-shifted again in accordance with the modified shifting points to increase the rotational speed of the electric machine 104 above the engine start limit 604. In the example depicted in FIG. 7, just after the second downshift, while the electric machine 104 is rotating above the engine start limit 604, the driver depresses the brake pedal such that the brake pedal pressure is beneath the threshold brake pedal pressure 708, as depicted in the third plot 606. Responsive to the brake pedal pressure being released beneath the threshold brake pedal pressure 708, the vehicle control unit 200 upshifts the transmission to bring the rotational speed of the electric machine 104 beneath the engine start limit 604 prior to ending the method 500. Such upshifting protects the engine clutch 110 from component damage upon re-engagement thereof responsive to driver acceleration demands. For example, after the control timeline depicted in FIG. 7, the driver may press an accelerator pedal. If the acceleration demanded by the driver is above the capabilities of the electric machine 104, the vehicle control unit 200 may shift operation of the powertrain 100 to a hybrid mode by closing the engine clutch 110 to swiftly provide the demanded acceleration without any up-shifting delays or damage to the engine clutch 110.

It should now be understood that the present disclosure relates to modifying the shifting points of a transmission of a hybrid-electric vehicle during regenerative braking. The shifting points may be modified in instances where an initial rotational speed of the electric machine is relatively high, such that downshifting of the transmission would result in the electric machine being operated above an engine start limit used outside of regenerative braking. For example, outside of regenerative braking, a vehicle control unit may automatically engage an engine clutch to start an engine to maintain a difference rotational speeds of the engine and electric machine beneath the engine start limit and protect the engine clutch from component damage. During regenerative braking, the modified shifting schedule may result in downshifting of the transmission at higher vehicle speeds than when using a base shifting schedule outside of regenerative braking. The earlier shifting points in accordance with the modified shifting schedule may operate the electric machine along a maximum power curve thereof to improve regenerative braking efficiency.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of controlling a hybrid-electric vehicle, the method comprising:
   determining that a slow-down condition of the hybrid-electric vehicle comprises a reduction in speed of the hybrid-electric vehicle that is greater than or equal to a threshold;
   modifying transmission shifting points in a regenerative braking mode to rotate an electric machine of the hybrid-electric vehicle above an engine start limit; and
   in response to receiving an indication of an end of the slow-down condition, causing rotation of the electric machine above the engine start limit to trigger starting an engine of the hybrid-electric vehicle, the indication of the end of the slow-down condition comprising a release of a brake pedal.

2. The method of claim 1, further comprising disengaging an output of the engine from the transmission by opening an engine clutch disposed between the engine and the electric machine.

3. The method of claim 2, further comprising:
   in response to receiving the indication of the end of the slow-down condition, determining that the electric machine is rotating above the engine start limit, and
   in response to determining that the engine is rotating above the engine start limit, up-shifting the transmission to cause the rotational speed of the electric machine to drop below the engine start limit.

4. The method of claim 3, further comprising, after up-shifting the transmission, engaging the engine clutch to provide torque generated by the engine to the transmission in response to receiving an acceleration input.

5. The method of claim 1, wherein the determining that the slow-down condition of the hybrid-electric vehicle comprises the reduction in speed of the hybrid-electric vehicle that is greater than or equal to the threshold comprises a receiving a detection signal indicating the presence of stopped traffic.

6. The method of claim 1, wherein the determining that the slow-down condition of the hybrid hybrid-electric vehicle comprises the reduction in speed of the hybrid-electric vehicle that is greater than or equal to the threshold comprises receiving an input from a driver via actuation of an accelerator pedal or a brake pedal.

7. The method of claim 1, wherein the determining that the slow-down condition of the hybrid hybrid-electric vehicle comprises the reduction in speed of the hybrid-electric vehicle that is greater than or equal to the threshold comprises receiving information regarding traffic conditions via a vehicle control system.

8. The method of claim 1, wherein the determining that the slow-down condition of the hybrid hybrid-electric vehicle comprises the reduction in speed of the hybrid-electric vehicle that is greater than or equal to the threshold comprises determining that a brake pedal pressure is greater than or equal to a threshold.

9. The method of claim 1, wherein the transmission is down-shifted multiple times when operated in accordance with the modified transmission shifting points in order to maintain rotation of the electric machine above the engine start limit.

10. The method of claim 1, wherein the engine start limit is greater than or equal to 1500 revolutions per minute.

11. A method of controlling a hybrid-electric vehicle, the method comprising:
disengaging an engine clutch connecting an output of an engine to a transmission of the hybrid-electric vehicle;
while the engine clutch is disengaged, determining that a rotational speed of an electric machine is greater than or equal to an engine start limit;
engaging the engine clutch to start the engine and provide torque from the engine to the transmission;
in response to determining that a slow-down condition of the hybrid-electric vehicle comprises a reduction in speed of the hybrid-electric vehicle that is greater than or equal to a threshold, modifying transmission shifting points in a regenerative braking mode to rotate the electric machine above the engine start limit; and
in response to receiving an indication of an end of the slow-down condition, causing rotation of the electric machine above the engine start limit to trigger starting the engine.

12. The method of claim 11, further comprising disengaging the engine clutch prior to modifying the transmission shifting points.

13. The method of claim 12, further comprising:
in response to receiving the indication of the end of the slow-down condition, determining that the electric machine is rotating above the engine start limit, and
in response to determining that the engine is rotating above the engine start limit, up-shifting a transmission to cause the rotational speed of the electric machine to drop below the engine start limit.

14. The method of claim 13, further comprising, after up-shifting the transmission, engaging the engine clutch to provide torque generated by the engine to a driveshaft in response to receiving an acceleration input.

15. The method of claim 11, wherein the determining that a slow-down condition of the hybrid-electric vehicle comprises a reduction in speed of the hybrid-electric vehicle that is greater than or equal to a threshold comprises receiving at least one of a detection signal indicating the presence of stopped traffic, an input from a driver by actuation of an accelerator pedal or a brake pedal, and information regarding traffic conditions received via the vehicle control system.

16. The method of claim 11, wherein the indication of an end of the slow-down condition comprises a release of the brake pedal.

17. A vehicle control system for a hybrid-electric vehicle, the vehicle control system comprising a processing device and instructions that are executable by the processing device to cause the vehicle control system to: determine that the hybrid vehicle is encountering a slow-down condition; and remove the hybrid vehicle from a first driving mode, in which the controller is configured to control a clutch to engage a mechanical output of an engine with an input shaft of an electric machine, when a reduction in speed of the hybrid-electric vehicle is greater than or equal to a threshold, place the hybrid vehicle into a regenerative braking mode, in which a transmission is controlled such that the rotational speed of the electric machine is above a predetermined engine start limit without the output of the engine being engaged with the input shaft, and in response to receiving an indication of an end of the slow-down condition, cause rotation of the electric machine above the engine start limit to trigger starting the engine, the indication of the end of the slow-down condition comprising a release of a brake pedal.

18. The powertrain of claim 17, wherein the vehicle control system is configured to determine that the vehicle is encountering a slow-down condition based on one or more of a position of a brake pedal and a position of an accelerator pedal.

* * * * *

UNITED STATES PATENT AND TRADEMARK OFFICE
CERTIFICATE OF CORRECTION

PATENT NO. : 11,731,628 B2
APPLICATION NO. : 17/199717
DATED : August 22, 2023
INVENTOR(S) : Thomas S. Hawley It is certified that error appears in the above-identified patent and that said Letters Patent is hereby corrected as shown below:

In the Specification

In Column 5, Line(s) 9, delete "At least" and insert --at least--, therefor.

In Column 5, Line(s) 15, delete "form" and insert --from--, therefor.

In Column 11, Line(s) 6, before "regenerative", delete "an" and insert --the--, therefor.

Signed and Sealed this
Tenth Day of October, 2023

*Katherine Kelly Vidal*

Katherine Kelly Vidal
*Director of the United States Patent and Trademark Office*